Dec. 8, 1942.     A. A. PHELAN     2,304,507
ART OF CRACKING MINERAL OIL
Filed Nov. 21, 1938
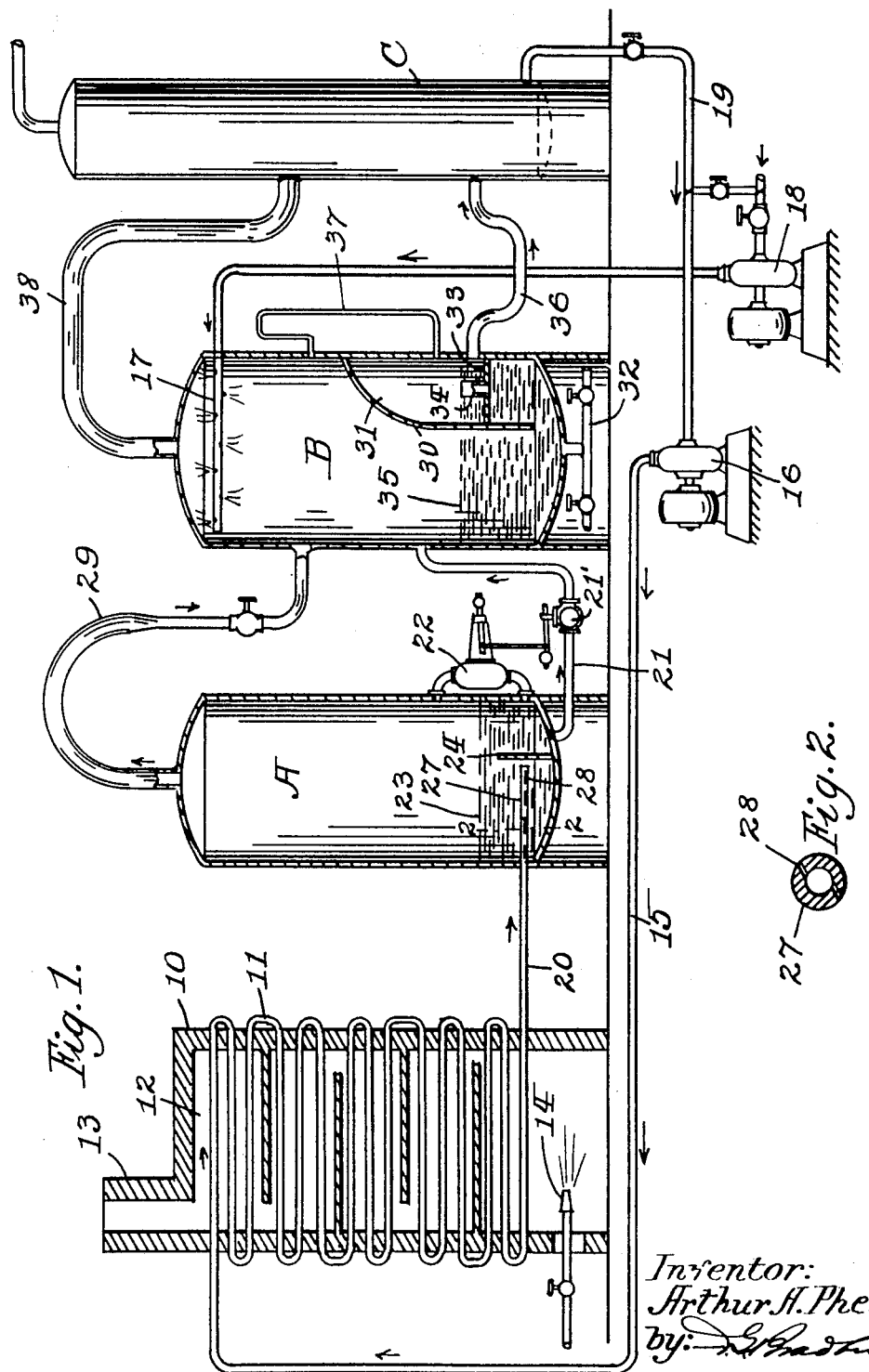
Inventor:
Arthur A. Phelan
by: ATTORNEY.

Patented Dec. 8, 1942

2,304,507

UNITED STATES PATENT OFFICE 2,304,507

ART OF CRACKING MINERAL OIL

Arthur A. Phelan, Los Angeles, Calif.; Cecily M. Phelan, administratrix of said Arthur A. Phelan, deceased Application November 21, 1938, Serial No. 241,527

7 Claims. (Cl. 196—59)

My invention relates to the art of refining mineral oils, and particularly to what is known as "cracking." The primary object is to produce an improved method and apparatus for cracking hydrocarbon oils into their constituents more efficiently and with less expense than heretofore. Among the advantages of my invention is the production of a continuous process for cracking petroleum products and in which the temperatures and time of reaction on both liquid and vapor are subject to control and calculation by the operator and a high yield of certain desired products may be produced in a highly efficient manner.

The refining industry recognizes three types of cracking processes: (1) The pressure distillate system, where conversion is held to occur in a liquid phase, the oil undergoing treatment being impliedly in a liquid condition in the zone where heating and cracking take place. (2) The mixed phase process, where vapor and liquid alike undergo the heat of reaction, and (3) The vapor phase process, where all the oil is converted into vapor before it reaches the cracking zone. The present invention practices the mixed phase process. Also the present invention is characterized by the fact that only moderate temperatures are necessary throughout the entire process.

While my invention is applicable to any refining system, it is particularly applicable to so-called cracking systems, in which the oil to be converted and refined is subjected to heat, or both heat and pressure, for the purpose of changing its physical characteristics or molecular structure. By the use of my invention the efficiency of such cracking systems can be largely increased with greater certainty than is at present possible. Also my invention provides even temperatures and readily calculated time exposure of the liquid and vapor in order to keep down the formation of carbon and waste gases and secure light gravity products. By its use the water, salt, sand, carbon and other objectionable matter are removed from the recirculating stock in an efficient manner, all of which is essential for highly efficient recovery purposes.

Further objects and advantages will be made evident hereinafter.

Referring to the drawing which is for illustrative purposes only, Fig. 1 is a sectional elevation through one embodiment of an apparatus suited to carry on my invention, the illustration being largely diagrammatic, and Fig. 2 is a section on an enlarged scale along line 2—2 of Fig. 1, of the retort inlet used in the reaction chamber.

In the embodiment shown, 10 is a heater, hereinafter sometimes referred to as a retort. In the form shown, 11 is a pipe coil, situated in the furnace enclosure 12, having a chimney 13 and being heated by a gas or oil burner 14. Oil delivered from the recirculating pump 16, enters the coil 11 through a pipe 15. Other well known forms of retorts may be substituted for the parts 10, 11 and 12 without departing from the spirit of my invention.

A is a reaction chamber in which vapor and gaseous products of the reaction and liquid are separated and certain reactions characteristic of the process of the invention are effected.

B is an apparatus performing useful and necessary functions of the operation in their proper place and sequence, away from the sphere of heating, reaction and fractionation for reasons later disclosed herein, and which consist of scrubbing free carbon from cracked vapor and gas, providing direct heat exchange between all incoming and cracked stocks, preparing a fuel fraction and recirculating stock, the latter liquid freed of water, salt, sand, sediment and light vapors, dispensing with heat exchangers, previous topping, dehydrating, handling or rehandling of any crude stocks used for cracking purposes; and because not otherwise known or named in the industry the apparatus denoted B for purposes of clarity and description will hereinafter be termed a "Flexator."

C is a fractionator in which the vapors and gases from the flexator B are fractionated into the desired finished products and from which all other products or materials consisting of liquid containing a large percentage of high-boiling hydrocarbons are recirculated for further reaction. Fresh stock which may be received from any suitable source of mineral oil supply is sprayed into the upper portion of the evaporating chamber in flexator B by the sprayer 17, by a pump 18, under suitable pressure to overcome the pressure in said chamber. The recirculating supply to the retort, consisting of high-boiling hydrocarbons, is provided by the egress duct 19 from the lower portion of the fractionator C and the recirculating pump 16. The recirculating stream from the fractionator is introduced into the pipe coil 11 at suitable pressure ranging from about 200 to 600 pounds per square inch and preferably at high velocity of from 3 to 12 feet per second, which pressure prevents vaporization of the oil in the retort to a large degree. The heat provided by the retort may raise the oil passing therethrough to a temperature ranging substantially between 800 degrees F. and 950 degrees F. When the heated oil under said pressure leaves the retort through pipe 20 it consists of liquid high-boiling hydrocarbons and low-boiling hydrocarbon vapors.

Upon entering the reaction chamber A the vapor and liquid separate. The separation being assisted by the weir 24 which forces all liquid and vapor to the surface. By commingling liquid and vapor an even temperature is maintained.

The regular flow and temperature of liquid permits of exact calculation of time exposure on the liquid fraction. The vapors subject to reaction, occupying a uniform space at uniform temperature, their time exposure is readily calculated. Its volume and its liquid equivalent being computed from the absolute temperatures and pressures prevailing according to the laws governing vapors and gases. The liquid after time exposure flows over the weir as shown and through the outlet duct 21. The said weir serving also to protect the outlet duct from the violent agitation set up by the incoming liquid and vapors. The hydrocarbon vapor and gaseous products of the reaction pass through the outlet pipe 29 into the upper portion of the flexator chamber B. The liquid level in the reaction chamber indicated by the broken line 23 is controlled at the outlet duct 21 by a liquid level control 22 as shown in the diagram.

To start the unit in operation fresh stock is picked up by the recirculating pump 16 and circulated through the retort or other heating medium used until a cracking temperature is attained which may vary between substantially 800 to 950 degrees F. The fresh stock pump 18 which is provided is then put in operation and the incoming stock is diverted to the upper portion of the flexator chamber B. The recirculating stock is then picked up at the bottom of the fractionating tower C. The stock heated to cracking temperature in the retort 10 enters the reaction chamber A by duct 20 and slotted openings 28 in the inlet 27 which spray the stream tangentially to the bottom and sides of the chamber (see Fig. 2), thereby setting up violent agitation, for the purpose of maintaining positive conduction and convection of heat on all vapors, and an even temperature and flow on all liquids undergoing reaction. In the bottom of the chamber the upright baffle plate 24 deflects the stream to the liquid surface, where, after giving up its vapors and gases, and being so deflected and subjected to the time exposure of its flow, it passes over the plate 24 and flows through the valve controlled outlet duct 21 to flexator B, where mixing, scrubbing, carbon removal and preliminary distillation occurs as will be hereinafter explained. The vapor, gases and free carbon formed in the reaction chamber A pass through the vapor outlet duct 29 to the flexator where they give up part of their heat, to distill, dehydrate and heat the incoming stock which is sprayed in the chamber through sprayer 17 to secure direct heat exchange, and for the added purpose of scrubbing free carbon from vapors and gases as part of their necessary final treatment. The liquids subjected to the reaction in chamber A and entering chamber B through duct 21 also cooperate in the same operation as explained.

Near the bottom and within the side of the flexator B is a downwardly extending partition 30, terminating above the bottom of said chamber to provide a compartment 31 with a passage entering its lower portion from the main chamber of the flexator. This partition prevents entry into said compartment 31 of vapor, salt, sediment, carbon or other objectionable materials, and deflects them to or near the bottom of the main chamber where they are removed with the fuel fraction taken off through the valved outlet 32. Deposition of carbon and sediment here is assisted by the partial cooling which occurs in the flexator. The inner compartment 31 is divided by a horizontal partition 33 having an upwardly extending duct 34 terminating approximately at even height with the normal level indicated by the broken line 35 of the liquid which collects in the lower portion of the main chamber of the flexator. Liquid from the main chamber of the flexator B is free to pass automatically upwardly through the duct 34 under hydrostatic pressure from within the main chamber into the inner compartment from which it flows through duct 36 into the lower portion of the fractionating tower C. The by-pass 37 between the main chamber in the flexator and the liquid seal provided by the inner compartment 31, forming a vent, equalizes the vapor and gas pressure so that steady flow is produced and so-called vapor binding is prevented.

The quantity of fuel oil removed from the bottom of the main chamber in the flexator B may be governed by the viscosity it is desired to maintain. All remaining high-boiling hydrocarbon liquid flows upwardly as shown through duct 34 and thence on through duct 36 into the lower portion of the fractionator to aid in distillation. From here it is picked up at the outlet 19 for continuous recirculation to the retort.

The flexator B is operated at a lower pressure than the reaction chamber A (from 10 to 80 pounds and at a temperature of from 400 to 700 degrees F.), and at or near the pressure and temperature of the finished fractionating tower C in order to aid vaporization and to secure the advantage of a naturally regulated flow. The low-boiling hydrocarbon constituents in the form of vapor and gas from the main chamber of the flexator B, enter the fractionating tower C through the duct 38 where they are fractionated into finished products in the usual manner as desired and all remaining high-boiling hydrocarbons are recirculated for further reaction.

For illustration of the operation of that part of the apparatus denoted the flexator B, if the circulating vapor, gas and liquid with a temperature of eight hundred degrees F. plus, from duct 29 meets the incoming fresh stock of 80 degrees F. introduced by the sprayer 17 and the two intermingle in the preferable proportion of two to one, the resulting temperature can be roughly calculated at 600 degrees F. plus. A temperature ample to effect distillation of light fractions at the moderate pressures of ten to eighty pounds, the reduced pressures which are recommended for this part of the operation and the finished fractionator following. In case highly emulsified stocks are handled the extra specific and latent heat called for in the vaporization of water can be readily offset by lowering the pressure in the chamber B and the fractionating column C. The chief object of maintaining moderate pressures at these points is to carry them on to the usual condenser and separator (not shown) in order to facilitate a cleaner separation of the fixed gas evolved in the process without the entrainment of light gasoline fractions.

In the operation of the unit any fraction may be utilized from residue to kerosene stock, including fuel oils and crude of any type. Typical operation with an average 27 A. P. I. asphaltic or mixed base crude would proceed approximately as follows for a throughput of 1000 barrels daily:

| | Barrels |
|---|---|
| Straight run gasoline, vaporized in chamber B, 25% | 250 |
| Cracked gasoline from remainder recirculated, 40% | 300 |
| Fixed gas and loss, 5% of original stock | 50 |
| Fuel oil of suitable viscosity, 40% of original stock | 400 |

The invention provides a continuous process in which a time exposure in both liquid and vapor phases for the holding of uniform temperature in the reaction chamber A is produced in such manner as will provide for the exact timing of the reaction on both liquid and vapor, the liquid being subject to time exposure while in regular continuous flow, and the exposure of vapor being readily calculated from its liquid equivalent at any operating temperature and pressure. The heat of conversion is not otherwise involved or checked in any way while liquid or vapor are undergoing reaction. The most moderate temperatures and pressures consistent with a high yield of light products are thus encouraged. High temperatures, which result in rapid conversion, also result in a more corresponding rapid destruction of desirable light fractions, because those desirable light fractions in general are more resistant to destruction and call for high temperatures or indefinite time exposure in order to be converted to still lighter products in the form of fixed gas, soot, or so-called free carbon, normally a waste in the process. On the other hand, with this invention hydrocarbons of heavier molecular structure are broken down under the influence of temperatures that will cause little waste on lighter products. Consequently unnecessary high temperatures or indefinite time exposures are discouraged in this invention where the object is to make the largest amount of gasoline with the smallest amount of waste and to maintain a circulating liquid of good viscosity free from tar and so-called coke.

A means of heat exchange at a minimum expense, without loss or added equipment is provided by directly mixing incoming and circulating unvaporized stock in the flexator.

Substantially all water or gasoline, if any, is removed from incoming stock, thereby effecting the saving of additional apparatus for topping and dehydrating, thus taking advantage of the latent heat of cracked vapors, and of greatly increased specific heat of mineral oils at high temperatures to secure the advantage of complete dehydration of all stock for recirculation. Salt, water, and other sediments contained in fresh stock are thus prevented from entering the sphere of heating or reaction and as each molecule of water vapor occupies over seven times the space of the average gasoline molecule and absorbs four times the heat of its distillation, pressures foreign to the reaction, absorbing heat, checking speed, and interfering with efficient operation are thus prevented.

Scrubbing of coke and free carbon from cracked vapors by the incoming crude fresh stock is provided in the flexator B which prevents clogging of lines and fractionating plates and aids in final treating. This process removes salt, coke, free carbon and sediment with the fuel fraction taken off previous to recirculation in order to prevent them from entering the retort and the zone of the cracking reaction.

The invention advantageously provides for the recirculation of remaining fractions after distillation of desired light fractions and the removal of sediments; and without previous overhead distillation and condensation, thus saving heat units and preventing overexposure of liquid and ruin of fuel viscosity. In this manner also vapors not in the distillation range of gasoline are not unduly subjected to the cracking temperatures that would cause unnecessary alteration of paraffine and naphthene constituents to unsaturated hydrocarbons of less stable composition, and which on recirculation have less resistance to their cracking temperatures without undue conversion to fixed gas, tar, free carbon, and polymerized hydrocarbons of abnormal distillation range. The objectionable feature of condensing coke, or so-called free carbon in condensed overhead distillates and recirculating the same is also done away with. The advantage of recirculating less altered hydrocarbons than are contained in overhead distillates subjected to the cracking temperatures is secured, and the cracking reaction can be maintained at lesser temperatures or shorter time exposures than in prior methods of recycling such distillates.

A further advantage is the provision in the fractionating column by the process set forth for the distillation of gasoline or other desired commodity by the residual heat of circulating partially cracked stocks and the heat absorbed by the incoming stock, thus reducing the heat of circulating stock picked up for recirculation at this point, to the heat of normal distillation and doing away with the necessity of special hot oil recirculating pumps and incidental expenses connected with pumping oil at high temperatures, and at the same time utilizing all heat of the reaction in useful and necessary functions at ideal efficiency, without loss.

A further important feature of this invention results from avoiding overhead distillation and subsequent condensation of other than light products not in or near the distillation range of desirable gasoline or motor fuels while the same are being subjected to reaction temperatures either in vapor or so-called liquid phases or other systems. Overexposure of vapor to this temperature results in waste and undesirable alteration. The same fault is inherent in so-called pressure distillate systems, where fixed gases evolved, such as methane, ethane, propane, and light gases of other homologous hydrocarbon series are not condensable at the pressure of commercial operation, but take up a large part of the reaction space to its detriment, and are to be here regarded as wet gases entraining large volumes of light gasoline fractions not released as formed, and consequently overexposed and partially destroyed. Under these same conditions the time exposure on liquid is long and indefinite, the temperature unequal and the flow irregular, due to no provision to keep currents of conduction and convection in rapid motion, resulting in local overheating and dehydrogenation of liquid with the formation of tar, coke, and other products which degrade the fuel and shorten the period of continuous operation.

In any system resorting to overhead distillation of products heavier than gasoline for the purpose of recirculation, an indiscriminate mixing of vapors occurs for the maximum duration of time exposure, and the heat so utilized to form gasoline cannot be prevented from destroying a portion of the gasoline already formed. The system also operates at a great thermal loss, and calls for much extra equipment to heat, fractionate, condense, and recycle condensed vapors, which of necessity entrain much of the free carbon formed in the reaction. It can be observed that time exposure as here provided occurs under a method of rough fractionation. No foreign matter is introduced to disturb the reaction in the chamber and the reaction is to a great degree selective—light vapors passing out of the sphere of reaction as rapidly as formed, while the heavier vapors maintained near the liquid surface, being near the state of equilibrium, are highly saturated and under the heat of reaction are constantly supplying light vapors in the range of gasoline for overhead distillation while all heavier ones are returned to the liquid.

It is noted coke formation in liquids undergoing the cracking reaction is not necessitated by natural law, unless cracking is carried to the ultimate with fixed gases, condensable vapors and solid residue as the products of reaction. The fluid then undergoes dehydrogenation progressively—by cracking and distillation of light components—to tar, asphalt, and solid residue. In naphthenic crudes of high asphaltic content this may be a considerable percentage of the original stock; in paraffin stocks it may be inconsiderable. Its formation is prevented by keeping the liquid in suitable fluid condition.

So-called free carbon in liquid occurs in another manner however, and is incidental to the formation of light vapors and fixed gases in the pipe-still or other heating medium, and in the chamber provided for reaction, and it may be there or later scrubbed or condensed in the liquid fraction. If liquid is not maintained in in steady flow, in time, due to the scrubbing action of condensed liquids and the carbon of their content as well, the contents of any reaction chamber will become a semi-fluid mass due to this cause; and if the chamber is directly exposed to fire a hard, solid mass will result whether the original fluid was asphaltic or not. This so-called free carbon is due to the scission of carbon bonds and hydrocarbon linkages from the exposure of vapors and fixed gases to high temperatures. Even in a well balanced reaction it will occur in some degree, and is to be distinguished from the residues left when the last volatile fraction is converted or distilled from a body of oil undergoing reaction. Carbon formation in this later case can be prevented as previously outlined, and its formation due to scission of molecular bonds can be held to a minimum by utilization of proper time exposure as provided in the application.

In previous methods of conducting this reaction, this free carbon has been largely carried in the vapors and recycled on condensation; or it has been partly knocked down in the liquid with no adequate provision made for its removal. Coincident with the formation of light vapors this carbon will occur in greater or less quantity. Thus at high temperatures the scission of hydrocarbon linkages is so rapid that the reaction cannot be profitably controlled and free hydrogen and the carbon referred to are the main products of the reaction. In balancing this reaction to secure best results skill and knowledge are largely frustrated without apparatus designed to take advantage of the natural laws outlined.

Hence the necessity of uniform heating of liquid and vapor, and for the removal of water, salt, sand and carbon from recirculating stocks. for the provision of even temperature and readily calculated time exposure to keep down the formation of carbon and waste gases, and to secure the largest percentage of light products that can be incorporated in the gasoline fraction.

Although this invention is primarily designed for the recirculation of products submitted to the cracking reaction without overhead distillation, and primarily for the making of gasoline, it may be utilized without change of principle for the production of other overhead distillates either as finished products or for purposes of recirculation by a lowering of the pressure on the functioning apparatus.

In accordance with the patent statutes, I have described the principles of operation of my invention together with the apparatus which I now consider to represent the best embodiment thereof, but I desire to have it understood that the structure shown is only illustrative and that the invention can be carried out by other means and applied to other uses than those above set forth within the spirit thereof and within the scope of the following claims.

I claim:

1. In a hydrocarbon oil cracking process conducted at cracking temperature and under superatmospheric conditions of pressure, and wherein fixed gas, vapors, altered liquid and free carbon are resultant products of reaction; a sediment resolving and eliminating zone in which a vapor space and liquid level are maintained, and in which the said products of reaction containing their retained heat are introduced substantially above the bottom thereof, simultaneously introducing a finely divided hydrocarbon oil stock for the process into the vapor space of said zone to contact and commingle with the said altered products, maintaining said zone at a pressure less than the pressure of reaction and at a temperature below that of cracking and substantially above 400 degrees Fahrenheit, resolving free carbon from fixed gas and vapor products of reaction by the contacting and commingling action of said oil stock, discharging fixed gas and vapors from said zone, forcing the liquid containing free carbon downward in flow, withdrawing free carbon with a liquid fraction, and thereafter forcing the remaining liquid upward in flow to discharge while simultaneously protecting it from contamination by the downward moving free carbon resolved from the products of reaction.

2. In a hydrocarbon oil cracking process conducted at cracking temperature and superatmospheric conditions of pressure, and wherein the heated oils have undergone reaction to altered products; a sediment resolving and eliminating zone in which a vapor space and liquid level are maintained, and in which the altered products containing their retained heat are introduced substantially above the bottom thereof, while simultaneously introducing to said zone raw hydrocarbon oil stock for the process to promptly contact and commingle with said altered products, maintaining said zone at a pressure less than the pressure of reaction and at a temperature below that of cracking, and substantially above 400 degrees F., vaporizing light fractions and also the water of raw oils and discharging them from said zone, resolving sand, salt, and sediment from raw oil stock by said maintained temperature, forcing the commingled oils containing resolved sediments downward in flow, and discharging sediments with a predetermined liquid fraction, and thereafter forcing the remaining oil upward in flow to discharge while simultaneously protecting it from contamination by the downward moving sediments of the commingled oils.

3. In a hydrocarbon oil cracking process conducted at cracking temperature and superatmospheric conditions of pressure, and wherein fixed gas, vapors, altered liquid and free carbon are products of reaction: a sediment resolving and eliminating zone in which a vapor space and liquid level are maintained, and in which the said products of reaction containing their retained heat are introduced substantially above the bottom thereof, simultaneously introducing to the said zone raw hydrocarbon oils for the process to promptly contact and commingle with said products of reaction, maintaining said zone at a pressure less than the pressure of reaction, and at a temperature below that of cracking and substantially above 400 degrees F., resolving sand, salt, sediment and water vapor from said raw oils, by said maintained heat, and free carbon from fixed gas and vapor products of reaction by said contacting and commingling action of raw oils, discharging fixed gas and vapors from said zone, forcing unvaporized oil containing free carbon and resolved sediments downward in flow to discharge said free carbon and sediments with a fuel fraction, and thereafter forcing the remaining unvaporized oil upward in flow to discharge, while simultaneously protecting it from contamination by the downward moving sediments and free carbon resolved from said raw oils and products of reaction.

4. In a hydrocarbon oil cracking process conducted at cracking temperature and under superatmospheric conditions of pressure and wherein fixed gas, vapors, altered liquid and free carbon are resultant products of reaction; a sediment resolving and eliminating zone in which a vapor space and liquid level are maintained, and in which the said products of reaction containing their retained heat are introduced substantially above the bottom thereof, simultaneously introducing a finely divided raw hydrocarbon oil for the process into the vapor space of said zone to contact and commingle with the said altered products, maintaining the said zone at a pressure less than the pressure of reaction, and at a temperature below that of cracking, and substantially above 400 degrees F., resolving salt, sand, sediment and vaporizing water and light vapors from said raw oils by said maintained heat, scrubbing free carbon down in liquid from fixed gas and vapors of reaction by said introduced raw oil, discharging fixed gas and vapors from said zone, forcing the unvaporized oil containing free carbon and resolved sediments downward in flow, and discharging free carbon and sediments with a predetermined liquid fraction, thereafter, forcing the remaining oil upward to discharge, while simultaneously protecting it from contamination by the downward moving sediments and free carbon resolved from said raw oils and products of reaction.

5. A hydrocarbon oil cracking process wherein the oil is heated to a cracking temperature, under pressure substantially preventing vaporization, while flowing in a restricted stream through a heating zone, the heated oil thence introduced to an unheated, enlarged zone of reaction, maintained at cracking temperature and superatmospheric pressure, and wherein a vapor space and liquid level are maintained, introducing the said heated oil in the bottom of said zone, thence forcing it upward substantially to the liquid level maintained in said zone, thence separating vaporous reaction products from liquid reaction products, and passing the vaporous products upward to discharge, thence forcing the liquid reaction products downward to discharge, introducing the said vaporous and liquid products discharged from said zone of reaction and containing their retained heat, into a sediment resolving and eliminating zone substantially above the bottom thereof, where they are promptly contacted and commingled with raw hydrocarbon oils for the process introduced to the said zone, maintaining a vapor space and liquid level in said zone, while maintaining it at a pressure less than the pressure of reaction and at a temperature below that of cracking and substantially above 400 degrees F., resolving sand, salt, sediment, water vapor and hydrocarbon vapor from said raw oils by said maintained heat, resolving free carbon from vaporous products of reaction by the contacting and commingling action of said introduced raw oils, discharging vapor products from said zone, forcing the unvaporized oils containing free carbon and resolved sediments downward in flow and discharging free carbon and sediments with a predetermined liquid fraction, forcing the remaining oil upward in flow to discharge, while simultaneously protecting it from contamination by downward moving sediments and free carbon resolved from the said raw oils and products of reaction, finally introducing the vapor products and upward flowing oil discharged from said zone into a zone of fractionation, where finished products are fractionated and condensed as desired, the fixed gas released and the remaining products circulated to said heating zone.

6. A hydrocarbon oil cracking process, which comprises, heating oil stock in a heating zone to a cracking temperature to produce heated products, maintaining the oil stock including the heated products therefrom in a reaction zone under the influence of a cracking temperature and superatmospheric pressure, subjecting all products of reaction from the reaction zone to the action of a vaporizing and sediment eliminating zone at a temperature less than the temperature of reaction and substantially over 400 degrees F. and a pressure substantially less than the pressure maintained in the reaction zone, scrubbing the vapor products of reaction by raw oil stock introduced to the zone for the process, resolving sand, salt and sediments from said raw oil stock by the heat of the reaction products, discharging vapor products upwardly to a zone of fractionation, removing resolved sediments downwardly with a predetermined unvaporized fraction, thereafter forcing the remaining liquid products upwardly to discharge to the zone of fractionation, finally fractionating said vapor and liquid products as desired, releasing fixed gas and circulating the remaining products to the heating zone.

7. In the process defined in claim 6, a positive pressure being maintained in the reaction zone between substantially 80 and 180 pounds per square inch and a pressure being maintained in the vaporizing and sediment eliminating zone of between substantially 10 and 80 pounds per square inch.

ARTHUR A. PHELAN.